United States Patent
Healy et al.

(10) Patent No.: US 7,150,433 B2
(45) Date of Patent: Dec. 19, 2006

(54) AIRCRAFT BOLSTER TRAYS

(75) Inventors: Brian Healy, Lake Forest, CA (US); Makoto Isomura, Rolling Hills Estates, CA (US); Garrick Talavera, Rancho Palos Verdes, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 361 days.

(21) Appl. No.: 10/641,040

(22) Filed: Aug. 15, 2003

(65) Prior Publication Data

US 2004/0075024 A1 Apr. 22, 2004

Related U.S. Application Data

(60) Provisional application No. 60/403,653, filed on Aug. 16, 2002.

(51) Int. Cl.
*B64C 11/00* (2006.01)

(52) U.S. Cl. .................. 244/118.5; 244/1 R; 224/483; 248/244

(58) Field of Classification Search .............. 244/118.5, 244/1 R; 224/483; 248/244
See application file for complete search history.

(56) References Cited

U.S. PATENT DOCUMENTS

| | | | | | |
|---|---|---|---|---|---|
| 4,019,601 | A | * | 4/1977 | Di Giovanni | 180/90 |
| 4,146,159 | A | * | 3/1979 | Hemmen | 224/275 |
| 5,106,003 | A | * | 4/1992 | Ma | 224/311 |
| 5,660,311 | A | * | 8/1997 | Soltau | 224/483 |
| 6,036,071 | A | * | 3/2000 | Hartmann et al. | 224/547 |
| 2003/0057340 | A1 | * | 3/2003 | Mann et al. | 248/274.1 |

OTHER PUBLICATIONS http://eclipseaviation.com/500jet/interior.htm, "Eclipse Aviation | Avionics and Interior," Dec. 2, 2003, pp. 1–4.
Aircraft Spruce Catalog, p. 500.

* cited by examiner

*Primary Examiner*—J. Woodrow Eldred
(74) *Attorney, Agent, or Firm*—Finnegan, Henderson

(57) ABSTRACT

The present invention relates to a bolster tray for an aircraft. A bolster tray provides a place for a pilot to keep papers and provides a writing surface during flight. In one implementation, the bolster tray may be extended, lifted, and rotated to provide for optimum paper storage and writing angles and so that the tray may be stowed when not needed.

65 Claims, 19 Drawing Sheets

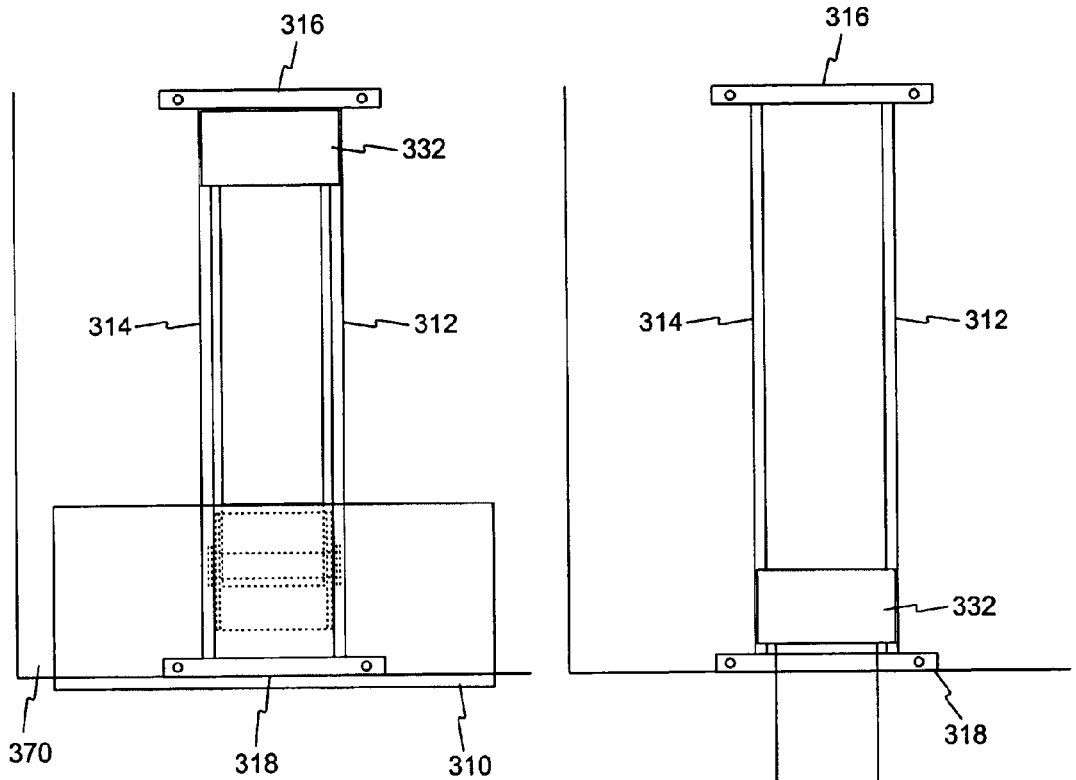

AIRCRAFT BOLSTER TRAYS

I. CROSS-REFERENCE TO RELATED APPLICATION

This application claims the benefit of U.S. Provisional Application No. 60/403,653, filed Aug. 16, 2002, by Brian Healy, Makoto Isomura, and Garrick Talavera and titled AIRCRAFT BOLSTER TRAYS, the disclosure of which is expressly incorporated herein by reference.

II. BACKGROUND

A. Technical Field

The present invention relates to aircraft bolster trays.

B. Related Art

Aircraft pilots need to refer to important papers such as approach plates, National Ocean Service (NOS) books, writing tablets, or charts during flight. Presently, an ordinary clipboard is used to allow the pilot to refer to such papers during flight. Generally, the clipboard either rests on the pilot's lap or is attached to the pilot's thigh with elastic straps. In many cases, the clipboard also contains a pen and pen holder to allow the pilot to write during flight.

These clipboards, however, have several drawbacks. First, clipboards that are not attached to the pilot may move during flight. This makes it difficult to maintain papers where they are needed and to write on those papers. Second, clipboards that are attached to the pilot can be uncomfortable and restrict the movement of the pilot. Third, neither type of clipboard can be easily moved and/or rotated to provide for an optimum writing angle and position.

Thus, there is a need for an apparatus for allowing pilots to write on and refer to important papers, which is secure, unrestricting, and can be rotated to optimum writing angles and positions.

III. SUMMARY OF THE INVENTION

An apparatus consistent with the present invention provides an aircraft bolster tray comprising a track section for mounting on a surface in the cockpit of an aircraft, the track section comprising a longitudinal axis; a sliding section partially located in the track section and mounted for moving within the track section in the direction of the longitudinal axis; a support arm connected to the sliding section and mounted for rotation relative to the sliding section; a tray rotating section connected to the sliding section and mounted for rotation relative to the support arm; and a tray connected to the tray rotating section.

Additional aspects of the invention are disclosed and defined by the appended claims. It is to be understood that both the foregoing general description and the following detailed description are exemplary and explanatory only and are not restrictive of the invention as claimed.

IV. BRIEF DESCRIPTION OF THE DRAWINGS

The accompanying drawings, which are incorporated in and constitute a part of this specification, illustrate several embodiments of the invention and, together with the following description, serve to explain the principles of the invention.

In the drawings:

FIG. 3E illustrates the retraction of a tray consistent with one embodiment of the invention, as shown in FIGS. 3A–3D;

FIG. 3F illustrates the extension of a tray consistent with one embodiment of the invention, as shown in FIGS. 3A–3D;

V. DESCRIPTION OF THE EMBODIMENTS

A. Introduction

Apparatus and methods consistent with the present invention will now be described with respect to an aircraft bolster tray. The following examples are only representative of embodiments and implementations consistent with the invention. Other embodiments and other implementations may also be used.

B. Apparatus and Methods

Figure 1:
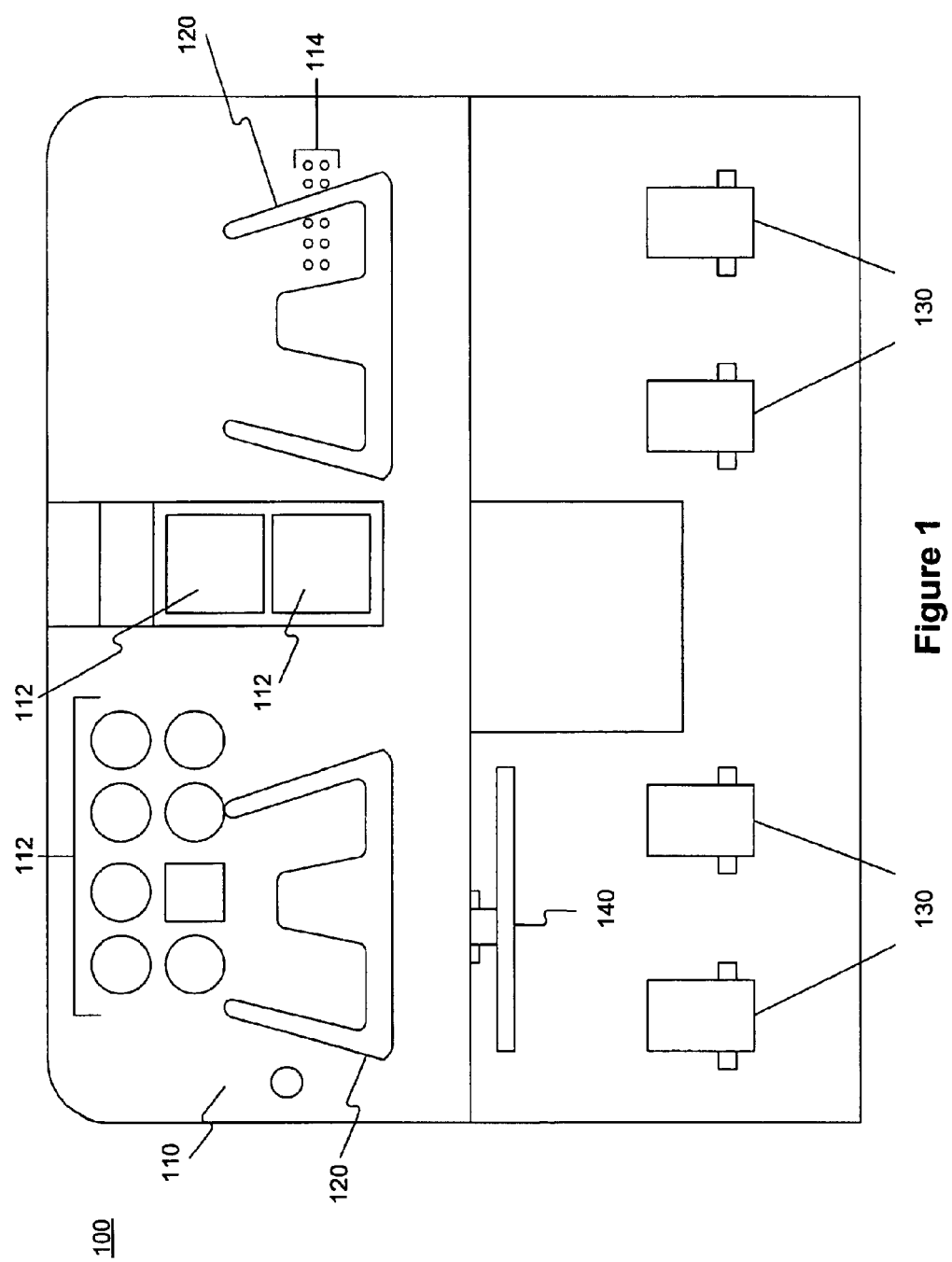
FIG. 1 is a front view of a cockpit for an aircraft consistent with one embodiment of the invention.

FIG. 1 is a front view of a cockpit for an aircraft consistent with one embodiment of the invention. As shown in FIG. 1, in one implementation, a cockpit 100 includes an instrument panel 110, control columns 120, rudder pedals 130, and a bolster tray 140. This implementation is merely exemplary, and other implementations may also be used.

Instrument panel 110 displays information regarding the aircraft to the pilot during flight and allows the pilot to control certain aspects of the aircraft. In one implementation, instrument panel 110 includes instruments 112 and switches 114. Instruments 112 include instruments to display information about the status of the aircraft. In one implementation, instruments 112 include air speed indicators, altimeters, fuel gauges, and other instruments. Instruments 112 may also include video display screens for displaying maps or geographic information, and other screens. Switches 114 include controls for the aircraft. In one implementation, switches 114 include light switches, fuel switches, landing gear switches, and other switches. These implementations are merely exemplary, and other implementations may also be used.

Control columns 120 control the longitudinal and lateral control surfaces of the aircraft, such as the elevator or ailerons. In one implementation, control columns 120 include two u-shaped steering columns. One steering column may be used by the pilot, while the other steering column may be used by a co-pilot. This implementation is merely exemplary, and other implementations may also be used.

Rudder pedals 130 control the rudder of the aircraft. In one implementation, the pilot or co-pilot depresses rudder pedals 130 to operate the rudder. This implementation is merely exemplary, and other implementations may also be used.

Bolster tray 140 holds papers and provides a writing surface for the pilot during flight. In one implementation, as shown in FIG. 1, bolster tray 140 may be partially located under instrument panel 110. This location allows bolster tray 140 to be positioned over the lap of the pilot when needed and stowed under the instrument panel when it is not needed. Bolster tray 140 is further described in FIGS. 3A–5B. This implementation is merely exemplary, and other implementations may also be used.

Figure 2:
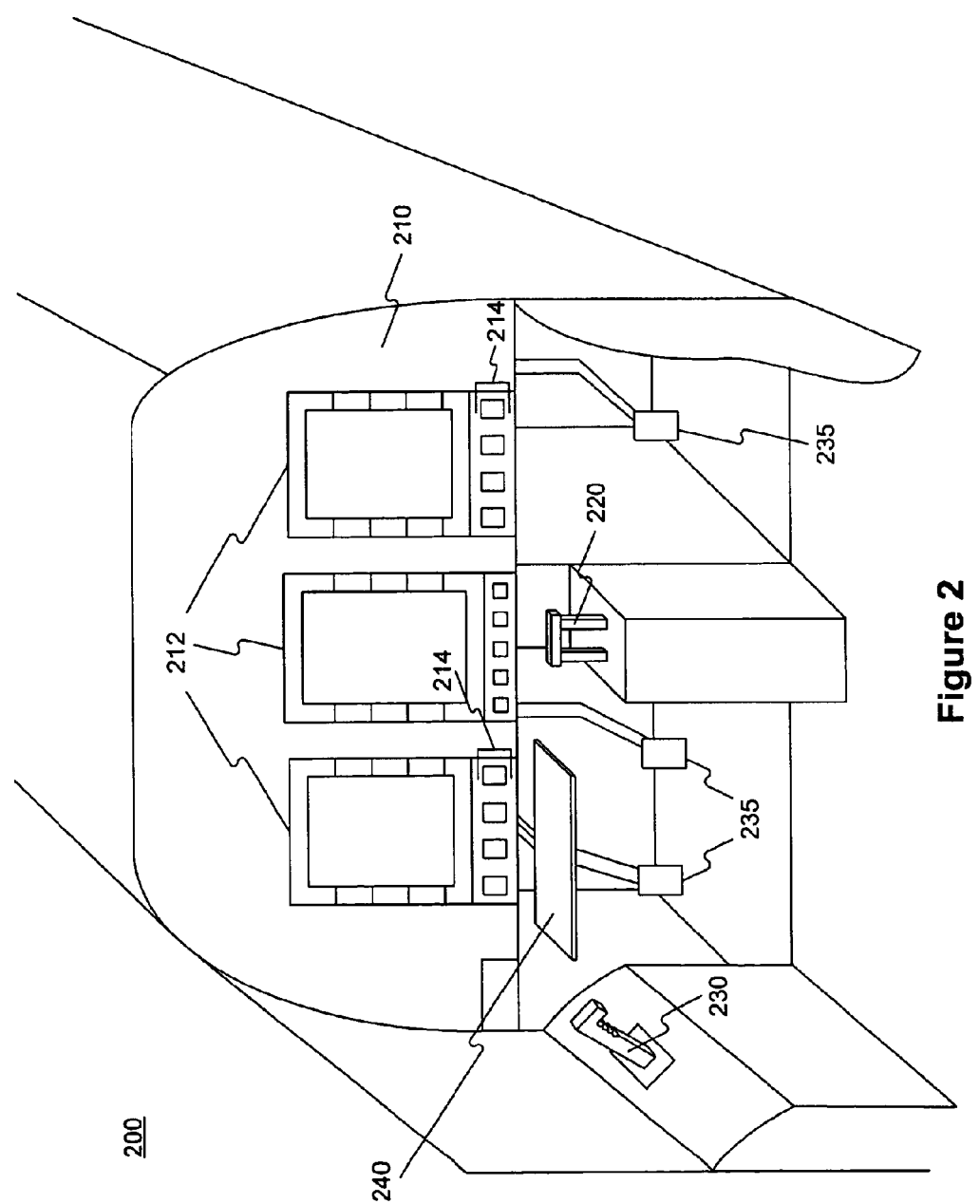
FIG. 2 is a front perspective view of a cockpit for an aircraft consistent with another embodiment of the invention.

FIG. 2 is a front perspective view of a cockpit for an aircraft consistent with another embodiment of the invention. As shown in FIG. 1, in one implementation, a cockpit 200 includes an instrument panel 210, throttle control 220, control stick 230, rudder pedals 235, and a bolster tray 240. This implementation is merely exemplary, and other implementations may also be used.

Instrument panel 210 displays information regarding the aircraft to the pilot during flight and allows the pilot to control certain aspects of the aircraft. In one implementation, instrument panel 210 includes video display screens 212 and switches 214. Video display screens 212 can display information about the status of the aircraft, such as speed, altitude, fuel, and other information, or maps and geographic information. Switches 214 include controls for the aircraft. Switches 214 include light switches, fuel switches, landing gear switches, and other switches. Switches 214 can also control what is displayed on video display screens 212. These implementations are merely exemplary, and other implementations may also be used.

Throttle control 220 includes controls for varying the power of the aircraft engine. In one implementation, throttle control 220 includes a throttle handle which can be moved forward and back to increase or decrease the power of the aircraft engine. This implementation is merely exemplary, and other implementations may also be used.

Control stick 230 controls the longitudinal and lateral control surfaces of the aircraft, such as the elevator or ailerons. In one implementation, the pilot moves control stick 230 to alter the direction of the aircraft. This implementation is merely exemplary, and other implementations may also be used.

Rudder pedals 235 control the rudder of the aircraft. In one implementation, the pilot or co-pilot depresses rudder pedals 235 to operate the rudder. This implementation is merely exemplary, and other implementations may also be used.

Bolster tray 240 holds papers and provide a writing surface for the pilot during flight. In one implementation, as shown in FIG. 1, bolster tray 240 may be mounted under instrument panel 210. This location allows bolster tray 240 to placed over the lap of the pilot when needed and stowed under the instrument panel when it is not needed. Bolster tray 240 is further described in FIGS. 3A–5B. This implementation is merely exemplary, and other implementations may also be used.

Figure 3A:
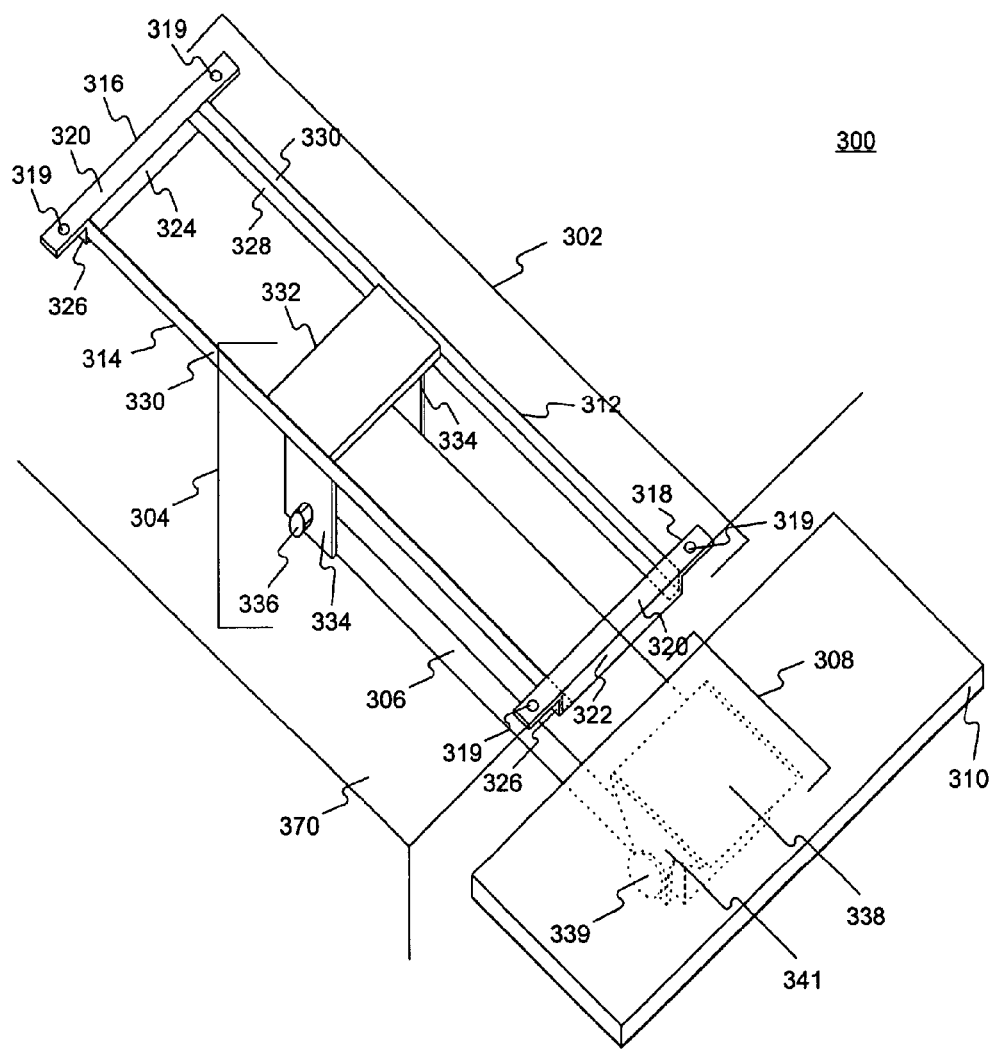
FIG. 3A is a top perspective view of a bolster tray for an aircraft consistent with one embodiment of the invention, as shown in FIGS. 1 and 2.
Figure 3B:
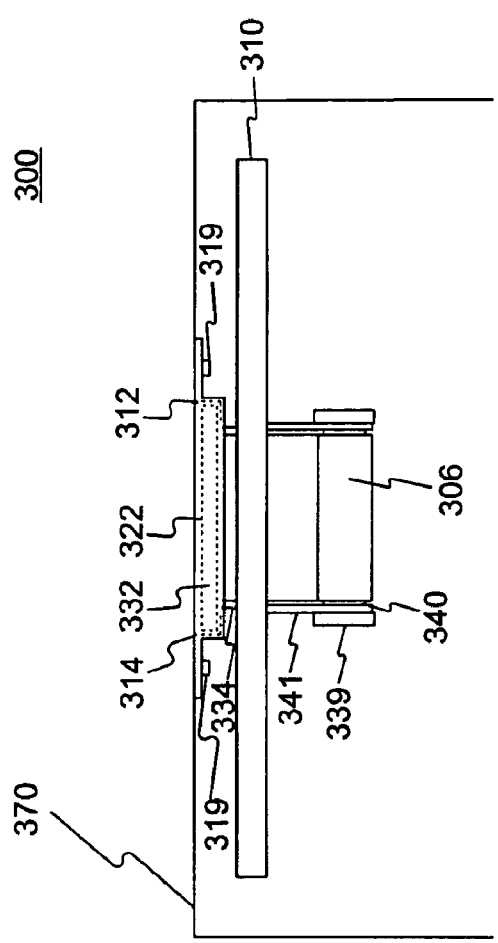
FIG. 3B is a front view of a bolster tray consistent with one embodiment of the invention, as shown in FIG. 3A.
Figure 3C:
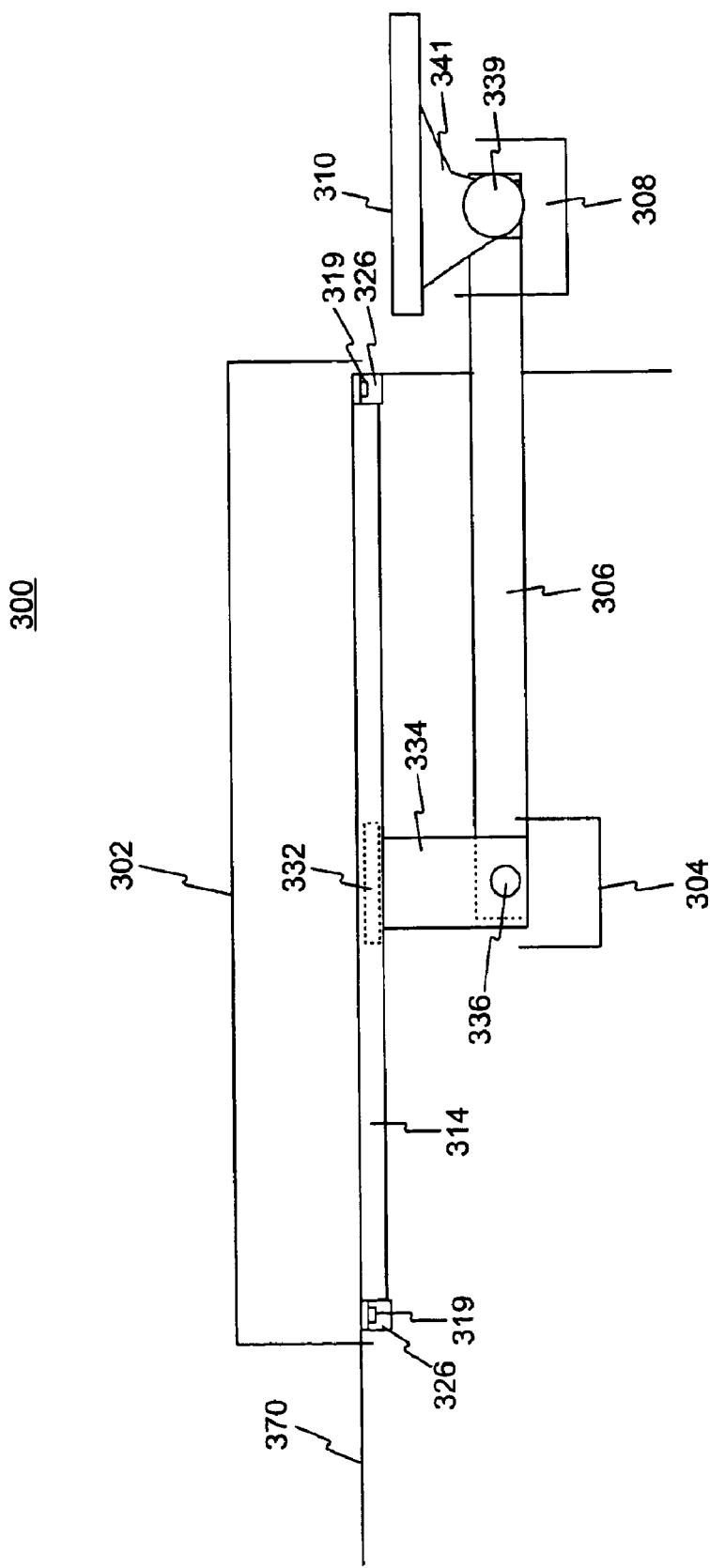
FIG. 3C is a side view of a bolster tray consistent with one embodiment of the invention, as shown in FIG. 3A.
Figure 3D:
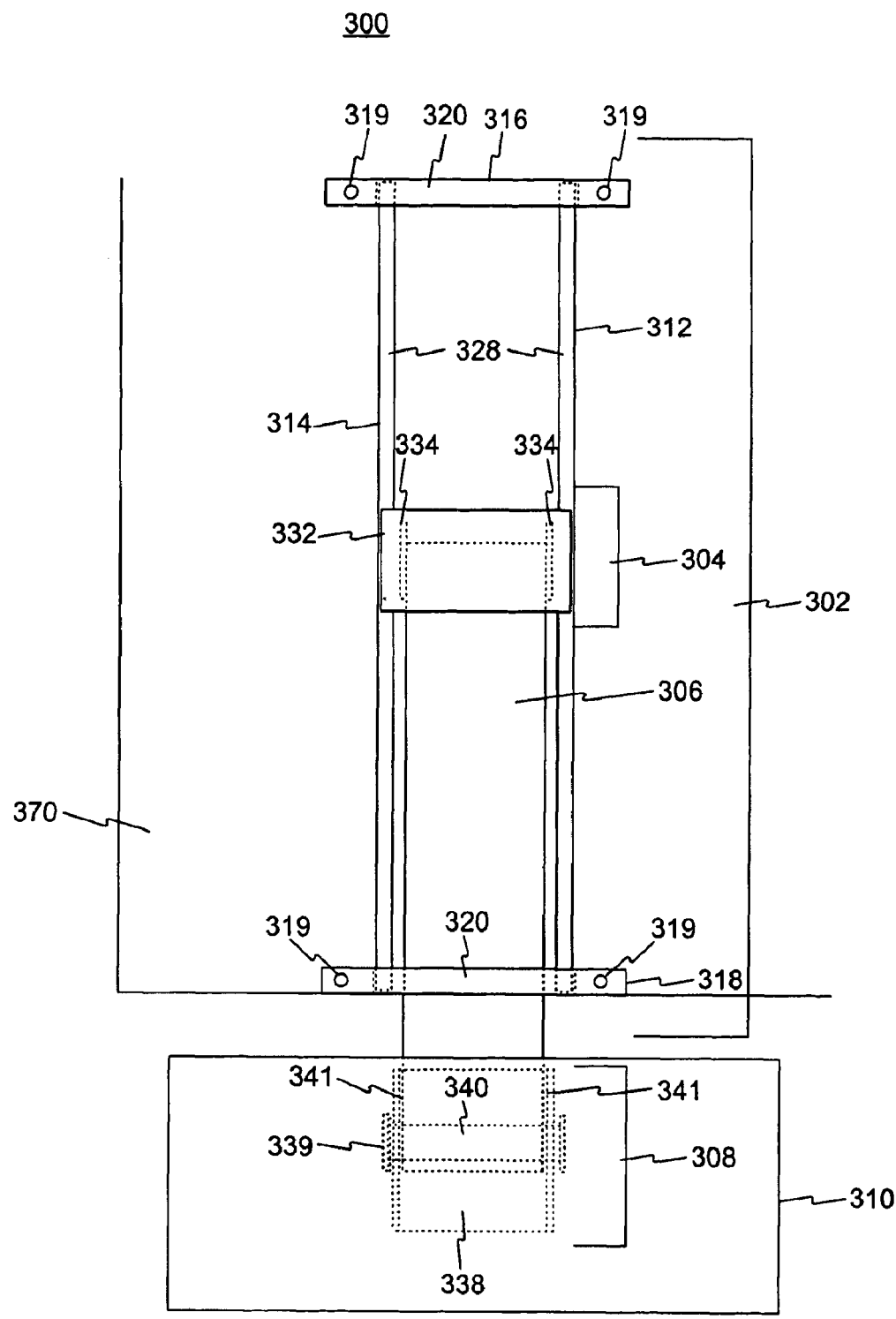
FIG. 3D is a top view of a bolster tray consistent with one embodiment of the invention, as shown in FIG. 3A.

FIGS. 3A–3D illustrate a bolster tray for an aircraft consistent with an embodiment of the present invention, as shown in FIGS. 1 and 2. FIG. 3A is a top perspective view of a bolster tray for an aircraft consistent with one embodiment of the invention, as shown in FIGS. 1 and 2. FIG. 3B is a front view of a bolster tray consistent with one embodiment of the invention, as shown in FIG. 3A. FIG. 3C is a side view of a bolster tray consistent with one embodiment of the invention, as shown in FIG. 3A. FIG. 3D is a top view of a bolster tray consistent with one embodiment of the invention, as shown in FIG. 3A. This implementation is merely exemplary, and other implementations may also be used.

As shown in FIGS. 3A, 3C, and 3D, in this implementation, a bolster tray 300 includes a track section 302, a sliding section 304, a support arm 306, a tray rotating section 308, and a tray 310. Tray 310 is connected to tray rotating section 308, which is connected to support arm 306, which is connected to sliding section 304. A portion of sliding section 304 lies in track section 302. Track section 302 is connected to the underside of surface 370. Surface 370 may be any appropriate surface in the cockpit. In one implementation, as shown in FIGS. 1–2, surface 370 is the underside of an instrument panel, such as instrument panel 110 or instrument panel 210. In FIGS. 3A and 3D, surface 370 is depicted as transparent for ease of illustration. This implementation is merely exemplary, and other implementations may also be used.

In this implementation, sliding section 304 may move in track section 302. As further described in FIGS. 3E–3F, as sliding section 304 moves, tray 310 extends or retracts. In addition, in this implementation, support arm 306 connects to sliding section 304 such that support arm 306 can be rotated with respect to sliding section 304. As further described in FIG. 3H, the rotation of support arm 306 allows tray 310 to be raised and lowered. Additionally, in still another implementation, tray rotating section 308 is attached to support arm 306 such that tray rotating section 308 can be rotated with respect to support arm 306. As further shown in FIG. 3G, the rotation of tray rotating section 308 rotates tray 310 such that tray 310 can be moved to a desired angle. These implementations are merely exemplary, and other implementations may also be used.

As described above, track section 302 provides a track for the movement of sliding section 304. In one implementation, as shown in FIGS. 3A and 3D, track section 302 comprises two L-pieces 312 and 314 having an L-shaped cross-section, and two end pieces 316 and 318. L-pieces 312 and 314 provide a surface on which sliding section 304 may move. End pieces 316 and 318 connect L-pieces 312 and 314 to surface 370 and also provide two end points limiting the movement of sliding section 304 on L-pieces 312 and 314. This implementation is merely exemplary, and other implementations may also be used.

In one implementation, as shown in FIG. 3A, L-pieces 312 and 314 comprise a bottom section 328 and a side section 330. Bottom section 328 provides a surface for the movement of sliding section 304. Side section 330 prevents sliding section 304 from moving outside of track section 302. This implementation is merely exemplary, and other implementations may also be used.

In one implementation, end pieces 316 and 318 comprise a top portion 320, a front portion 322, a bottom portion 324, and two side portions 326. Top portion 320 is attached to the underside of surface 370 by a fastening means. In one implementation, as shown in FIGS. 3A–3D, bolts 319 comprise the fastening means used to attach top portion 320 to surface 370. This implementation is merely exemplary, and other implementations may also be used.

As best seen in FIG. 3A, top portion 320, front portion 322, bottom portion 324, and side portions 326 combine to form a cavity into which L-pieces 312 and 314 are inserted. In one implementation, L-pieces 312 and 314 may be connected to end pieces 316 and 318. In another implementation, end pieces 316 and 318 are spaced apart on surface 370 such that L-pieces 312 and 314 fit tightly between end pieces 316 and 318. These implementations are merely exemplary, and other implementations may also be used.

As described above, sliding section 304 provides an apparatus for moving tray 310 and for rotating support arm 306. In one implementation, sliding section 304 comprises a sliding portion 332, two side sections 334, and an axle (not shown). As best shown in FIGS. 3A and 3D, side sections 334 are connected to opposing points on sliding portion 332. The axle connects support arm 306 to side sections 334 and allows support arm 306 to rotate as described above. This implementation is merely exemplary, and other implementations may also be used.

Sliding portion 332 moves within track section 302. In one implementation, friction between sliding portion 332 and track section 302 will prevent sliding portion 332 from moving too freely. In another implementation, sliding portion 332 may comprise wheels to move on tracks 302. In this implementation, a clamp apparatus may be used to create friction to prevent sliding portion 332 from moving too freely. This implementation is merely exemplary, and other implementations may also be used.

As described above, support arm 306 rotates on the axle connected to side sections 334. As shown in FIGS. 3A and 3C, sliding section 304 may also include a knob 336 to control the rotation of support arm 306. In this implementation, the clockwise rotation of knob 336 would result in the clockwise rotation of support arm 306. In another implementation, the axle could include a braking mechanism that when engaged would prevent support arm 306 from rotating, and when disengaged would allow support arm 306 to rotate freely. These implementations are merely exemplary, and other implementations may also be used.

Support arm 306 connects sliding section 304 to tray rotating section 308. In one implementation, the length of support arm 306 may be designed to allow for maximum extension while still allowing for tray 310 to be moved fully under surface 370. This implementation is merely exemplary, and other implementations may also be used.

Tray rotating section 308 connects tray 310 to support arm 306. As described above, tray rotating section 308 also allows tray 310 to rotate relative to support arm 306. In one implementation, tray rotating section 308 comprises top section 338, two side sections 341, and an axle 340. In this implementation, side sections 341 are connected to opposite ends of top section 338. Axle 340 connects support arm 306 to tray rotating section 308 and allows tray rotating section 308 to rotate. This implementation is merely exemplary, and other implementations may also be used.

As shown in FIGS. 3A–3D, top section 338 connects to tray 310. Top section 338 may be connected to tray 310 by any appropriate means, such as an adhesive. Therefore, in this implementation, tray 310 will rotate along with tray rotating section 308. This implementation is merely exemplary, and other implementations may also be used.

As described above, tray rotating section 308 rotates on axle 340 connected to support arm 306. As shown in FIGS. 3A–3D, tray rotating section 308 may also include a knob 339 to control the rotation of tray rotating section 308. In this implementation, the clockwise rotation of knob 339 would result in the clockwise rotation of tray rotating section 308. In another implementation, the axle could include a braking mechanism that, when engaged, would prevent tray rotating section 308 from rotating, and when disengaged, would allow tray rotating section 300 to rotate freely. These implementations are merely exemplary, and other implementations may also be used.

Tray 310 holds papers and provides a writing surface during flight. In one implementation, tray 310 may include a holding means, such as a spring clip, for holding papers, a pen, and pen holder, a light, and other items. Tray 310 is further described in FIGS. 5A–5B. This implementation is merely exemplary, and other implementations may also be used.

FIG. 3E illustrates the retraction of a tray consistent with one embodiment of the invention, as shown in FIGS. 3A–3D. As shown in FIG. 3E, sliding portion 332 may be moved on L-pieces 312 and 314 until it abuts end-portion 316. At this point, tray 310 is substantially underneath surface 370. In a cockpit, such as that shown in FIGS. 1 and 2, this would allow tray 310 to be stowed underneath an instrument panel when it is not needed. This implementation is merely exemplary, and other implementations may also be used.

As described above, sliding portion 332 may comprise wheels to allow sliding portion 332 to move on L-pieces 312 and 314. In one implementation, sliding portion 332 would also comprise a breaking mechanism to prevent sliding portion 332 from moving. In another implementation, sliding portion 332 would include an electrically-operated motor. In this implementation, pushing a button switch, which would activate the motor, would rotate the wheels on sliding portion 332. These implementations are merely exemplary, and other implementations may also be used.

FIG. 3F illustrates the extension of a tray consistent with one embodiment of the invention, as shown in FIGS. 3A–3D. As shown in FIG. 3F, sliding portion 332 may be moved on L-pieces 312 and 314 until it abuts end-portion 318. At this point, tray 310 is at its maximum extension. In a cockpit, such as that shown in FIGS. 1 and 2, this would allow tray 310 to be moved to accommodate any seat location for different sized pilots. Sliding portion 332 may be moved by any of the methods described in FIG. 3F. In addition, sliding portion 332 may be moved to any point between end piece 316 and end piece 318. This implementation is merely exemplary, and other implementations may also be used.

Figure 3G:
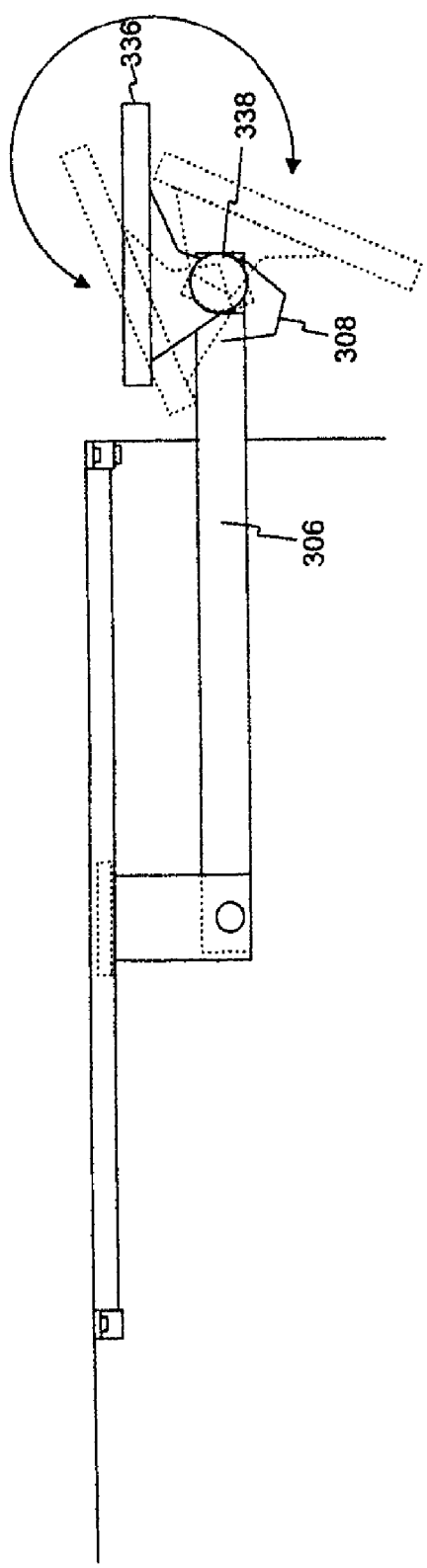
FIG. 3G illustrates the rotation of the tray rotating section consistent with one embodiment of the invention, as shown in FIGS. 3A–3D.

FIG. 3G illustrates the rotation of the tray rotating section consistent with one embodiment of the invention, as shown in FIGS. 3A–3D. As shown in FIG. 3G, tray rotating section 308 rotates relative to support arm 306. This allows tray 310, which is attached to tray rotating section 308 as described above, to be tilted to different angles. As described above, knob 338 may be used to control the rotation of tray rotating section 308. In this implementation, the clockwise rotation of knob 338 would result in the clockwise rotation of tray rotating section 308. In another implementation, axle 340 (not shown here, but shown in FIG. 3B) may include a braking mechanism that, when engaged, would prevent tray rotating section 308 from rotating, and when disengaged, would allow tray rotating section 308 to rotate freely. In still another implementation, tray rotating section 308 would include an electrically-operated motor. In this implementation, pushing a button switch, which would activate the motor, would rotate tray rotating section 308. These implementations are merely exemplary, and other implementations may also be used.

Figure 3H:
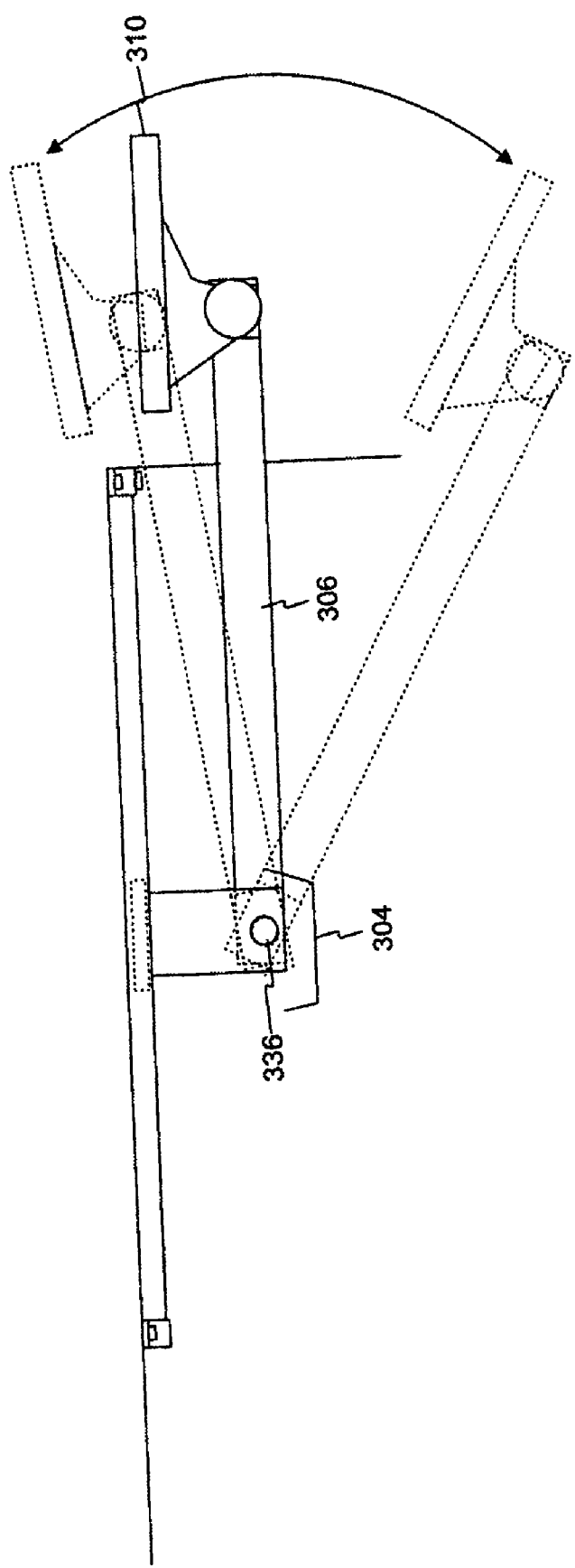
FIG. 3H illustrates the rotation of the support arm consistent with one embodiment of the invention, as shown in FIGS. 3A–3D.

FIG. 3H illustrates the rotation of the support arm consistent with one embodiment of the invention, as shown in FIGS. 3A–3D. As shown in FIG. 3H, support arm 306 rotates relative to sliding section 304. This allows tray 310 to be raised and lowered to accommodate pilots of different heights. As described above, knob 336 may be used to control the rotation of support arm 306. In this implementation, the clockwise rotation of knob 336 would result in the clockwise rotation of support arm 306. In another implementation, the axle upon which support arm 306 rotates may include a braking mechanism that, when engaged, would prevent support arm 306 from rotating, and when disengaged, would allow support arm 306 to rotate freely. In still another implementation, support arm 306 would include an electrically-operated motor. In this implementation, pushing a button switch would activate the motor, which would rotate support arm 306. These implementations are merely exemplary, and other implementations may also be used.

Figure 4A:
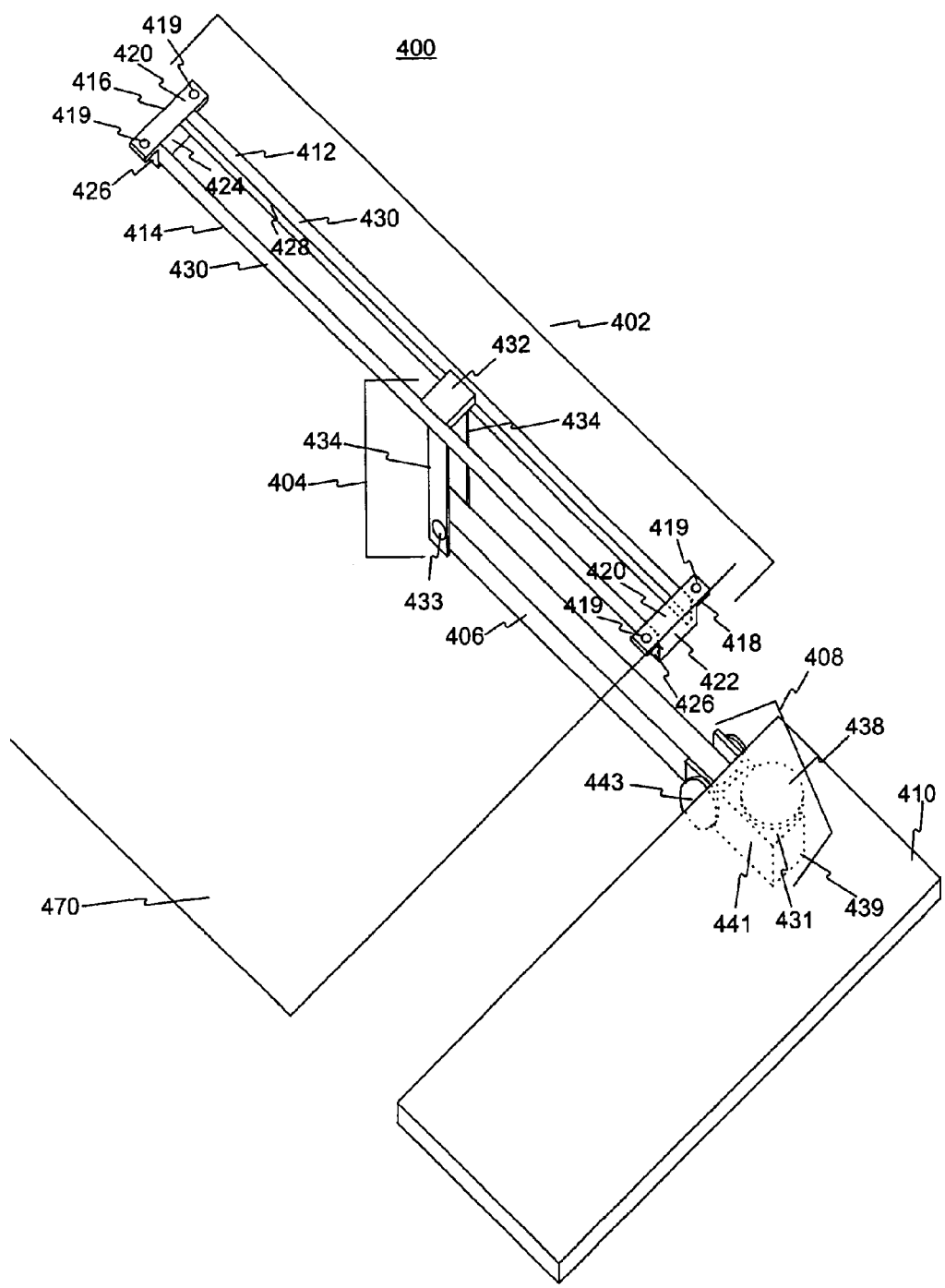
FIG. 4A is a top perspective view of a bolster tray for an aircraft consistent with a second embodiment of the invention, as shown in FIGS. 1 and 2.
Figure 4B:
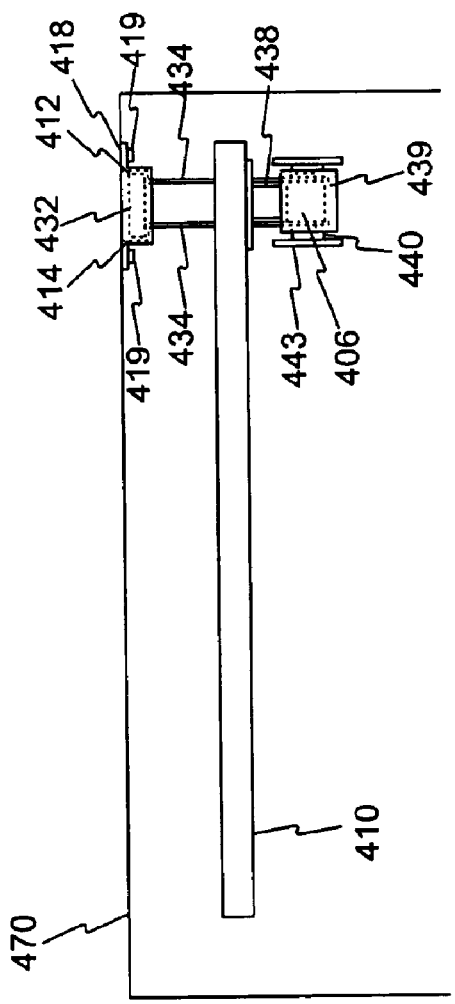
FIG. 4B is a front view of a bolster tray consistent with a second embodiment of the invention, as shown in FIG. 4A.
Figure 4C:
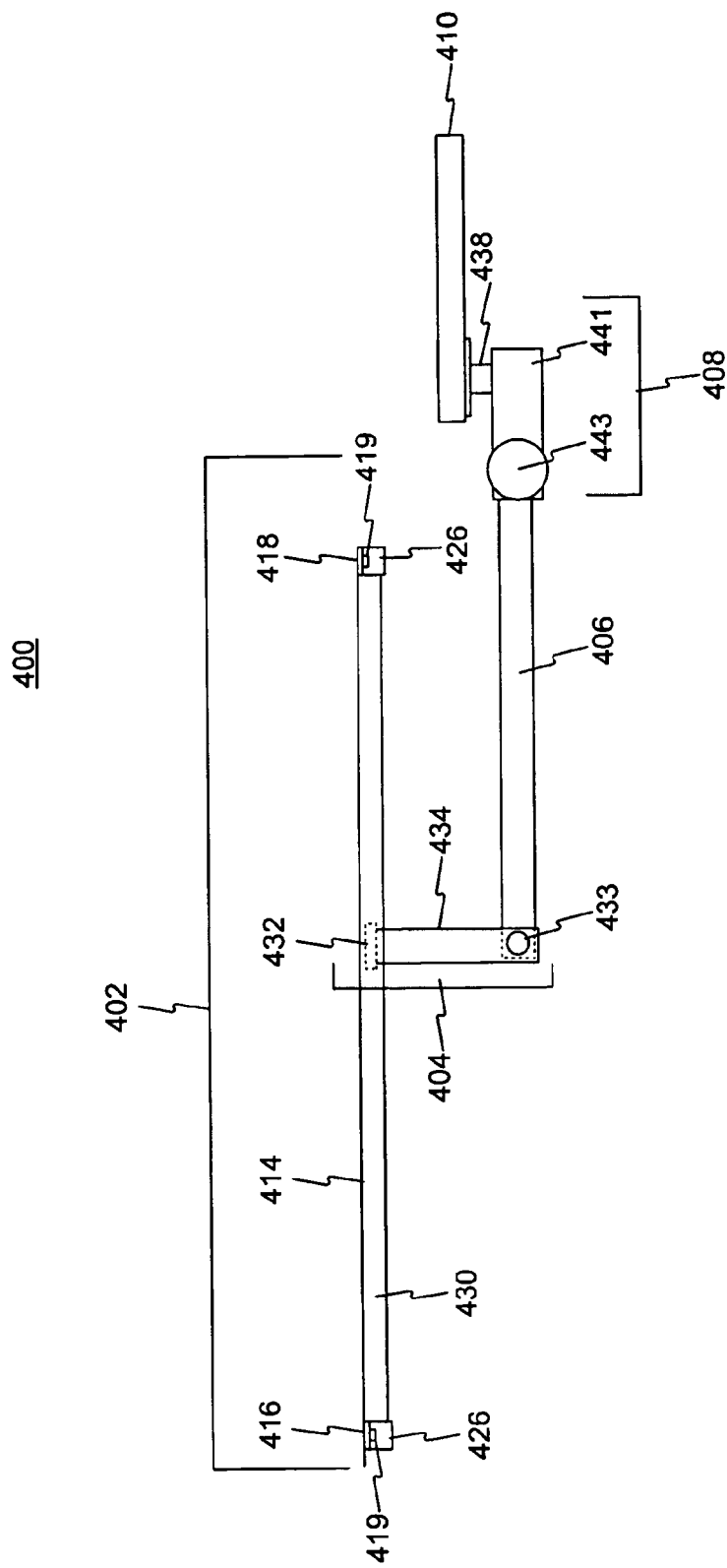
FIG. 4C is a side view of a bolster tray consistent with a second embodiment of the invention, as shown in FIG. 4A.
Figure 4D:
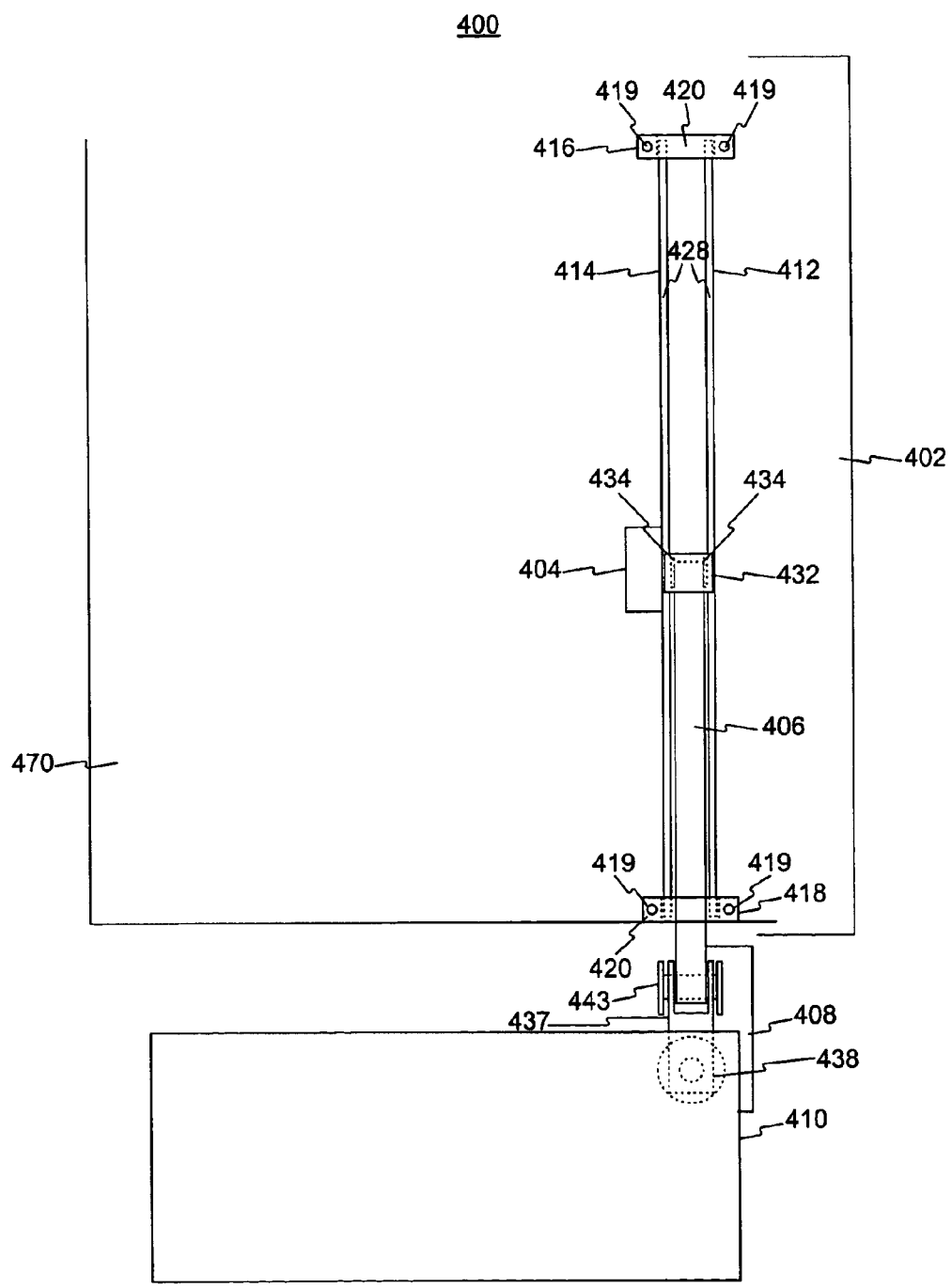
FIG. 4D is a top view of a bolster tray consistent with a second embodiment of the invention, as shown in FIG. 4A.

FIGS. 4A–4D illustrate a bolster tray for an aircraft consistent with a second embodiment of the invention. FIG. 4A is a top perspective view of a bolster tray for an aircraft consistent with a second embodiment of the invention, as shown in FIGS. 1 and 2. FIG. 4B is a front view of a bolster tray consistent with a second embodiment of the invention, as shown in FIG. 4A. FIG. 4C is a side view of a bolster tray consistent with a second embodiment of the invention, as shown in FIG. 4A. FIG. 4D is a top view of a bolster tray consistent with a second embodiment of the invention, as shown in FIG. 4A. This implementation is merely exemplary, and other implementations may also be used.

As shown in FIGS. 4A, 4C, and 4D, in this implementation, a bolster tray 400 includes a track section 402, a sliding section 404, a support arm 406, a tray rotating section 408, and a tray 410. Tray 410 is connected to tray rotating section 408, which is connected to support arm 406, which is connected to sliding section 404. A portion of sliding section 404 lies in track section 402. Track section 402 is connected to the underside of surface 470. Surface 470 may be any appropriate surface in the cockpit. In one implementation, as shown in FIGS. 1–2, surface 470 is the underside of an instrument panel, such as instrument panel 110 or instrument panel 210. In FIGS. 4A and 4D, surface 370 is depicted as transparent for ease of illustration. This implementation is merely exemplary, and other implementations may also be used.

In one implementation, sliding section 404 may move within track section 402. As further described in FIGS. 4E–4F, as sliding section 404 moves within track section 402, tray 410 also moves. In addition, in another implementation, support arm 406 connects to sliding section 404 such that support arm 406 can be rotated with respect to sliding section 404. As further described in FIG. 4H, the rotation of support arm 406 allows tray 410 to be raised and lowered. Additionally, in still another implementation, tray rotating section 408 is attached to support arm 406 such that tray rotating section 408 can be rotated with respect to support arm 406. As further shown in FIG. 4G, the rotation of tray rotating section 408 rotates tray 410 such that tray 410 can be moved to a desired angle. Also, in yet another implementation, tray rotating section 408 is connected to tray 410 such that tray 410 can be rotated with respect to tray rotating section 408. As further shown in FIG. 4I, the rotation of tray 410 allows the tray to be turned to a desired position. These implementations are merely exemplary, and other implementations may also be used.

As described above, track section 402 provides a track for the movement of sliding section 404. In one implementation, as shown in FIG. 4A, track section 402 comprises two L-pieces 412 and 414 having an L-shaped cross section, and two end portions 416 and 418. L-pieces 412 and 414 provide a surface for sliding section 404 to move on. End portions 416 and 418 connect L-pieces 412 and 414 to surface 470 and also provide two end points for the movement of sliding section 404 on L-pieces 412 and 414. This implementation is merely exemplary, and other implementations may also be used.

In one implementation, as shown in FIG. 4A, L-pieces 412 and 414 comprise a bottom section 428 and a side section 430. Bottom section 428 provides a surface for the movement of sliding section 404. Side section 430 prevents sliding section 408 from moving outside of track section 402. This implementation is merely exemplary, and other implementations may also be used.

In one implementation, end portions 416 and 418 comprise a top portion 420, a front portion 422, a bottom portion 424, and two side portions 426. Top portion 420 is attached to the underside of surface 470 by a fastening means. In one implementation, as shown in FIGS. 4A–4D, bolts 419 are the fastening means used to attach top portion 420 to surface 470. This implementation is merely exemplary, and other implementations may also be used.

As best seen in FIG. 4A, top portion 420, front portion 422, bottom portion 424, and side portions 426 combine to form a cavity into which L-pieces 412 and 414 are inserted. In one implementation, L-pieces 412 and 414 may be connected to end portions 416 and 418. In another implementation, end portions 416 and 418 are spaced apart on surface 470 such that L-pieces 412 and 414 fit tightly between end portions 416 and 418. These implementations are merely exemplary, and other implementations may also be used.

As described above, sliding section 404 provides an apparatus for moving tray 410 and for rotating support arm 406. In one implementation, sliding section 404 comprises a sliding portion 432, two side sections 434, and an axle 433. As best shown in FIGS. 4A and 4C, side sections 434 are connected to opposing points on sliding portion 432. Axle 433 connects support arm 406 to side sections 434 and allows support arm 406 to rotate as described above. This implementation is merely exemplary, and other implementations may also be used.

Sliding portion 432 moves within track section 402. In one implementation, the friction between sliding portion 432 and track section 402 will prevent sliding portion 432 from moving too freely. In another implementation, sliding portion 432 may comprise wheels to move on track section 402. In this implementation, a clamp apparatus may be used to create friction to prevent sliding portion 432 from moving too freely. This implementation is merely exemplary, and other implementations may also be used.

As described above, support arm 406 rotates on axle 433 connected to side sections 434. Sliding section 404 may also include a knob to control the rotation of support arm 406. In this implementation, the clockwise rotation of the knob would result in the clockwise rotation of support arm 406. In another implementation, axle 433 could include a braking mechanism that when engaged would prevent support arm 406 from rotating, and when disengaged would allow support arm 406 to rotate freely. These implementations are merely exemplary, and other implementations may also be used.

Support arm 406 connects sliding section 404 to tray rotating section 408. In one implementation, the length of support arm 406 may be designed to allow for maximum extension while still allowing for tray 410 to be moved fully under surface 470. This implementation is merely exemplary, and other implementations may also be used.

Tray rotating section 408 connects tray 410 to support arm 406. As described above, tray rotating section 408 also allows tray 410 to rotate relative to support arm 406 and to rotate relative to tray rotating section 408. In one implementation, tray rotating section 408 comprises rotating section 438, top section 437, two side sections 441, front section 439, and an axle 440. In this implementation, side sections 441 are connected to opposite ends of front section 439 and opposite ends of top section 437. Axle 440 connects support arm 406 to tray rotating section 408 and allows tray rotating section 408 to rotate. This implementation is merely exemplary, and other implementations may also be used.

As shown in FIGS. 4A–4C, top section 437 connects to rotating section 438, which connects to tray 410. Rotating section 438 may be connected to tray 310 by any appropriate means, such as an adhesive. Rotating section 438 allows tray 410 to rotate relative to tray rotating section 408. This implementation is merely exemplary, and other implementations may also be used.

As described above, tray rotating section 408 rotates on axle 440 connected to support arm 406. As shown in FIGS. 4A–4D, tray rotating section 408 may also include a knob 443 to control the rotation of tray rotating section 408. In this implementation, the clockwise rotation of knob 443 would result in the clockwise rotation of tray rotating section 408. In another implementation, axle 440 could include a braking mechanism that, when engaged, would prevent tray rotating section 408 from rotating, and when disengaged, would allow support arm 406 to rotate freely. These implementations are merely exemplary, and other implementations may also be used.

Tray 410 provides a place to hold papers and for providing a writing surface during flight. In one implementation, Tray 410 may include a holding means, such as a spring clip, for holding papers, a pen, and pen holder, a light, and other items. Tray 410 is further described in FIGS. 5A–5B. This implementation is merely exemplary, and other implementations may also be used.

Figure 4E:
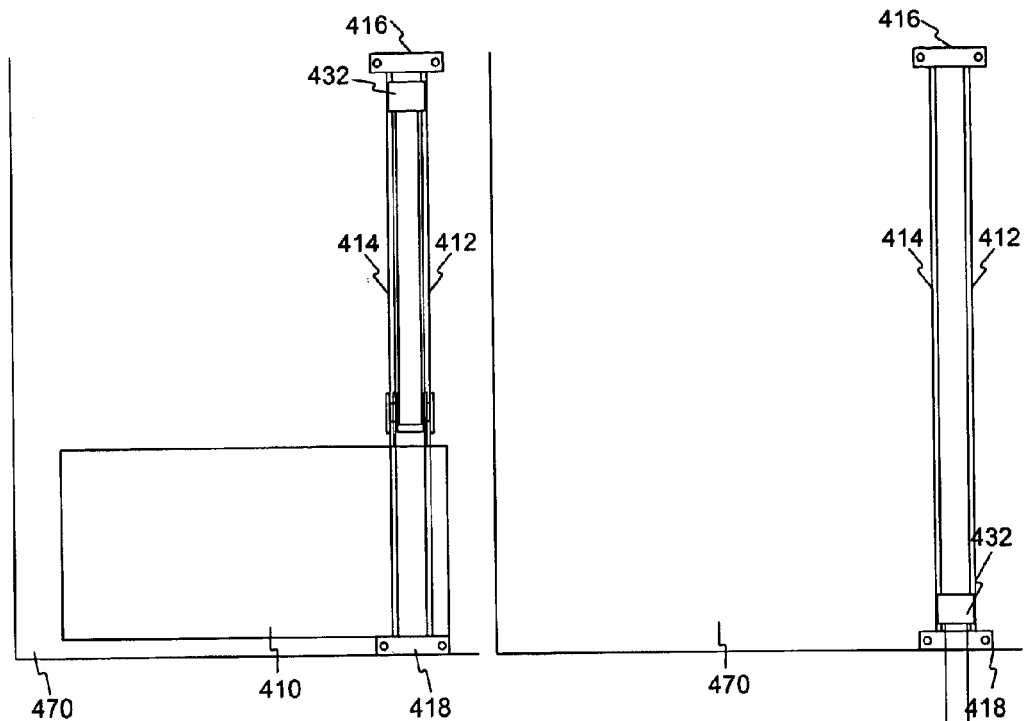
FIG. 4E illustrates the retraction of a tray consistent with a second embodiment of the invention, as shown in FIGS. 4A–4D.

FIG. 4E illustrates the retraction of a tray consistent with a second embodiment of the invention, as shown in FIGS. 4A–4D. As shown in FIG. 4E, sliding portion 432 may be moved on L-pieces 412 and 414 until it abuts end-portion 416. At this point, tray 410 is substantially underneath surface 470. In a cockpit, such as that shown in FIGS. 1 and 2, this would allow tray 410 to be stowed underneath an instrument panel when it is not needed. This implementation is merely exemplary, and other implementations may also be used.

As described above, sliding portion 432 may comprise wheels to allow sliding portion 432 to move on L-pieces 412 and 414. In one implementation, sliding portion 432 would also comprise a breaking mechanism to prevent sliding portion 432 from moving. In another implementation, sliding portion 432 would include an electrically-operated motor. In this implementation, pushing a button switch , which would activate the motor, would rotate the wheels on sliding portion 432. These implementations are merely exemplary, and other implementations may also be used.

Figure 4F:
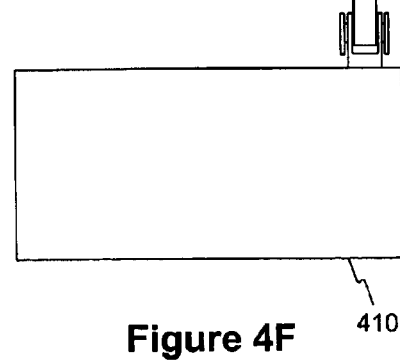
FIG. 4F illustrates the extension of a tray consistent with a second embodiment of the invention, as shown in FIGS. 4A–4D.

FIG. 4F illustrates the extension of a tray consistent with a second embodiment of the invention, as shown in FIGS. 4A–4D. As shown in FIG. 4F, sliding portion 432 may be moved on L-pieces 412 and 414 until it abuts end-portion 418. At this point, tray 410 is at its maximum extension. In a cockpit, such as that shown in FIGS. 1 and 2, this would allow tray 410 to be moved to accommodate any seat location for different sized pilots. Sliding portion 432 may be moved by any of the methods described in FIG. 4E. In addition, sliding portion 432 may be moved to any point between end portion 416 and end portion 418. This implementation is merely exemplary, and other implementations may also be used.

Figure 4G:
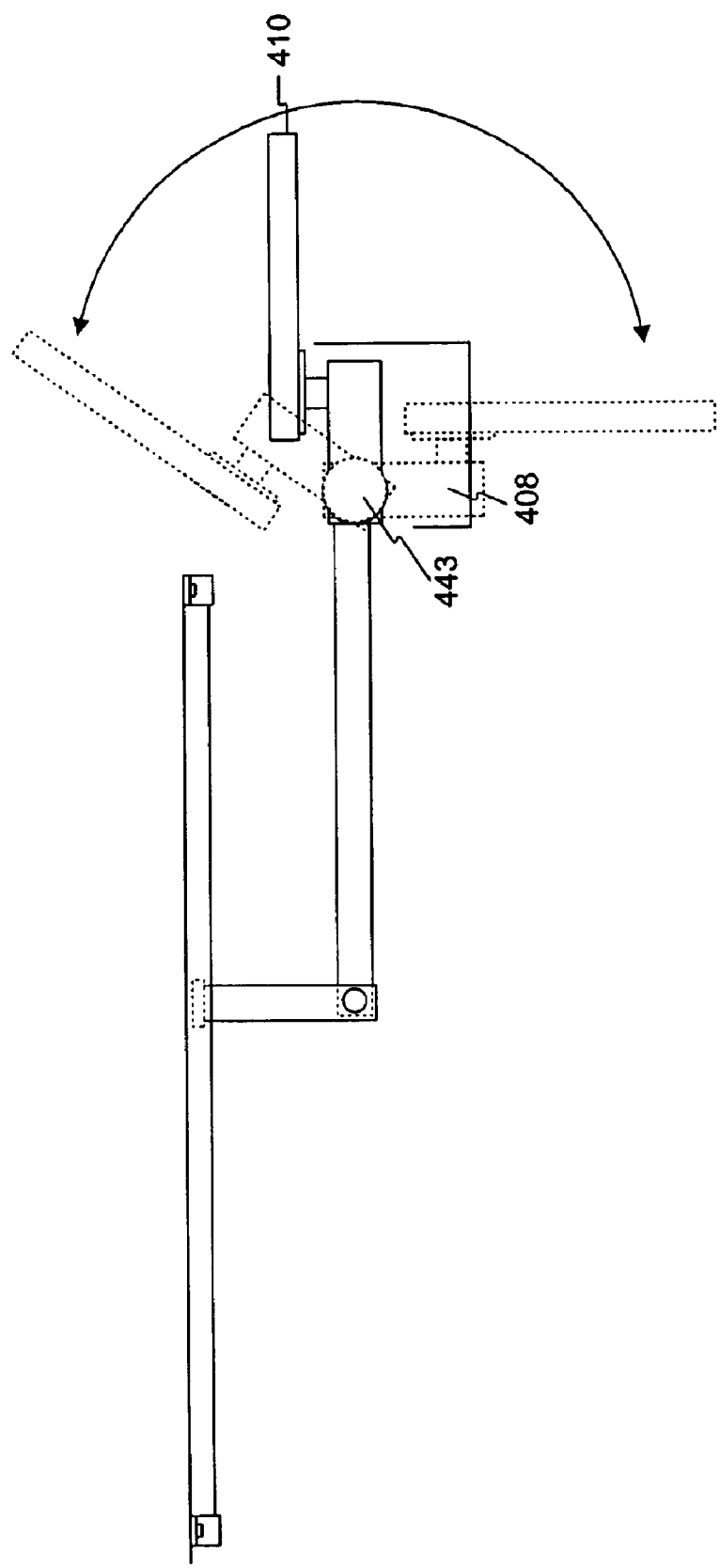
FIG. 4G illustrates the rotation of the tray rotating section consistent with a second embodiment of the invention, as shown in FIGS. 4A–4D.

FIG. 4G illustrates the rotation of the tray rotating section consistent with a second embodiment of the invention, as shown in FIGS. 4A–4D. As shown in FIG. 4G, tray rotating section 408 rotates relative to support arm 406. This allows tray 410, which is attached to tray rotating section 408 as described above, to be tilted to different angles. As described above, knob 443 may be used to control the rotation of tray rotating section 408. In this implementation, the clockwise rotation of knob 443 would result in the clockwise rotation of tray rotating section 408. In another implementation, axle 440 (not shown here, but shown in FIG. 4B) may include a braking mechanism that, when engaged, would prevent tray rotating section 408 from rotating, and when disengaged, would allow tray rotating section 408 to rotate freely. In still another implementation, tray rotating section 408 would include an electrically-operated motor. In this implementation, pushing a button switch, which would activate the motor, would rotate tray rotating section 408. These implementations are merely exemplary, and other implementations may also be used.

Figure 4H:
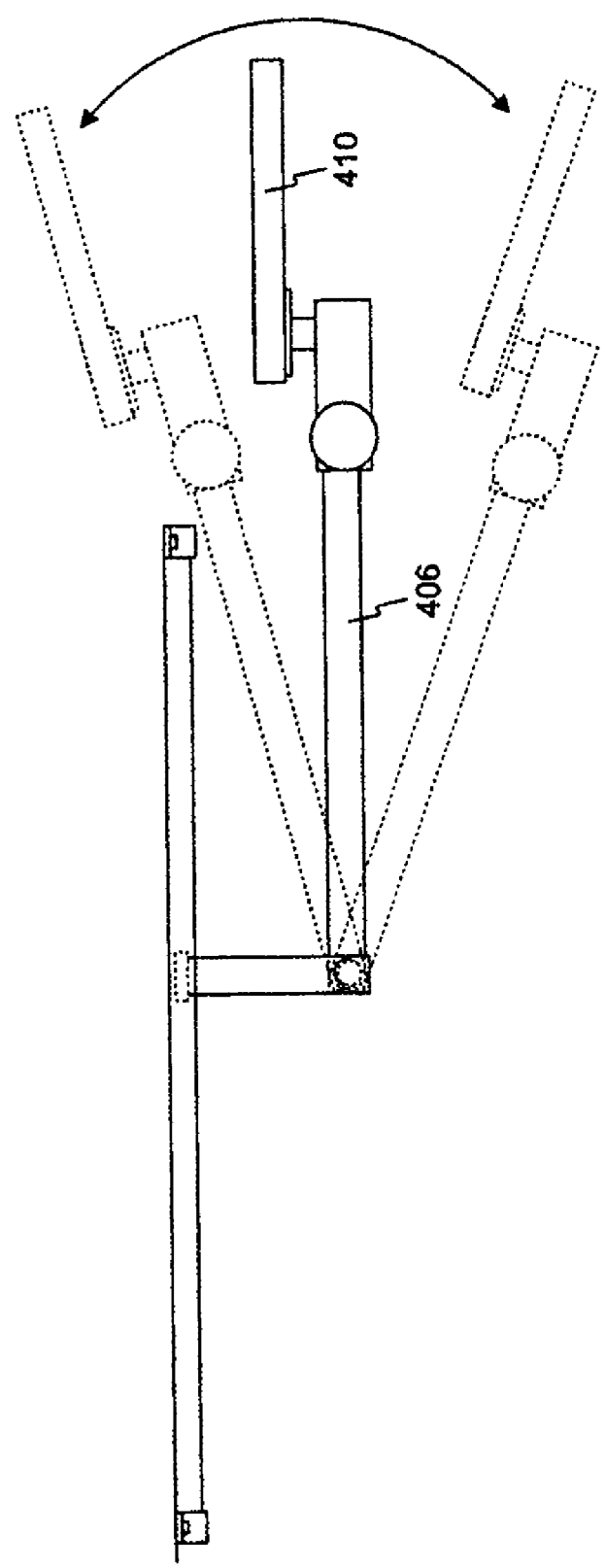
FIG. 4H illustrates the rotation of the support arm consistent with a second embodiment of the invention, as shown in FIGS. 4A–4D.

FIG. 4H illustrates the rotation of the support arm consistent with a second embodiment of the invention, as shown in FIGS. 4A–4D. As shown in FIG. 4H, support arm 406 rotates relative to sliding section 402. This allows tray 410 to raise and lowered to accommodate pilots of different heights. As described above, a knob may be used to control the rotation of support arm 406. In this implementation, the clockwise rotation of the knob would result in the clockwise rotation of support arm 406. In another implementation, axle 433 (not shown here, but shown in FIG. 4A) may include a braking mechanism that, when engaged, would prevent support arm 406 from rotating, and when disengaged, would allow support arm 406 to rotate freely. In still another implementation, support arm 406 would include an electrically-operated motor. In this implementation, pushing a button switch would activate the motor, which would rotate support arm 406. These implementations are merely exemplary, and other implementations may also be used.

Figure 4I:
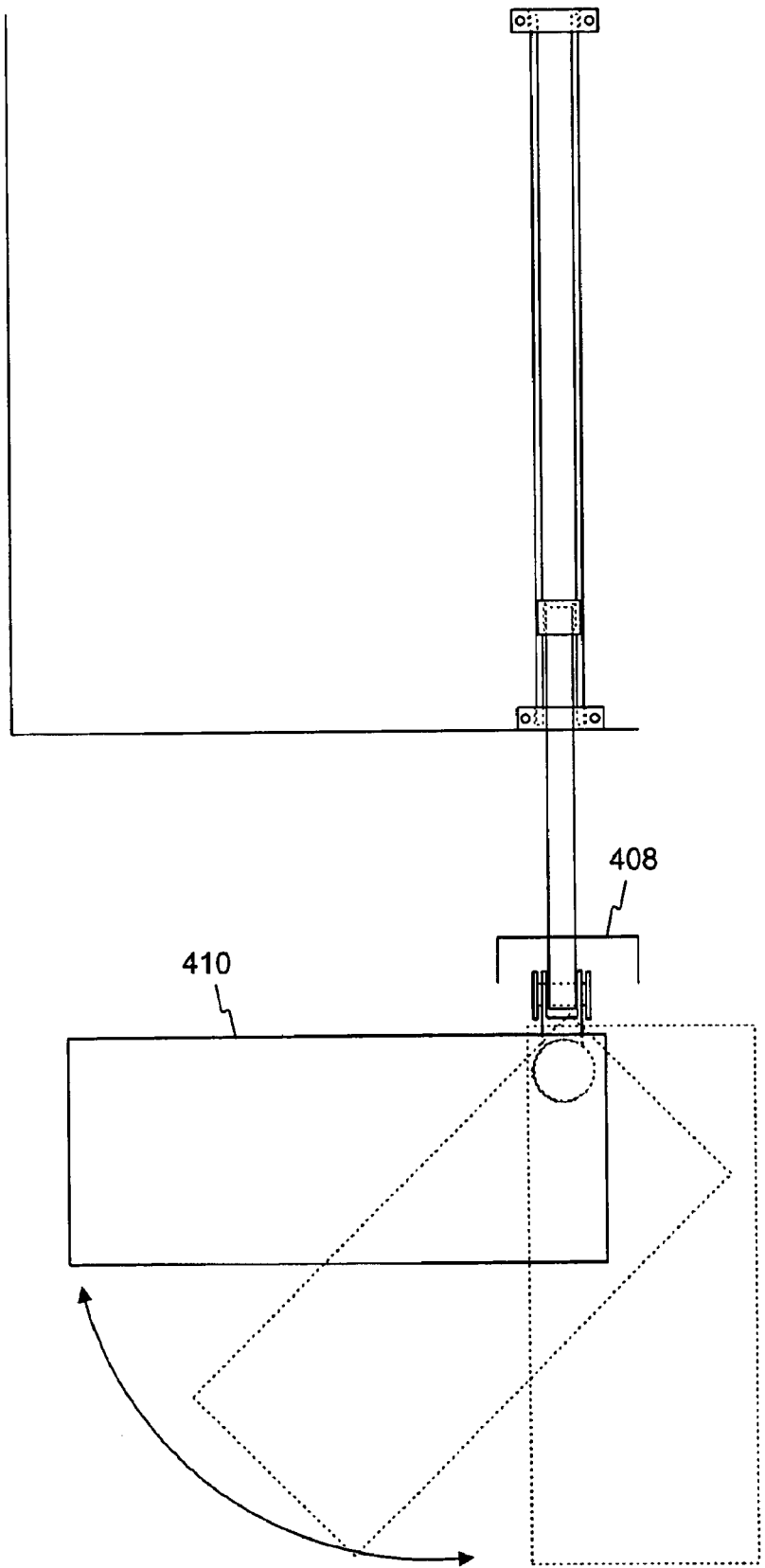
FIG. 4I illustrates the rotation of the tray consistent with a second embodiment of the invention, as shown in FIGS. 4A–4D.

FIG. 4I illustrates the rotation of the tray consistent with a second embodiment of the invention, as shown in FIGS. 4A–4D. As shown in FIG. 4I, tray 410 rotates relative to tray rotating section 408. This allows tray 410 to be rotated relative to the pilot. In one implementation, tray 410 could be locked into place to prevent it from rotating. In another implementation, tray rotating section 408 would include an electrically-operated motor. In this implementation, pushing a button switch would activate the motor, which would rotate tray 410. These implementations are merely exemplary, and other implementations may also be used.

Figure 5A:
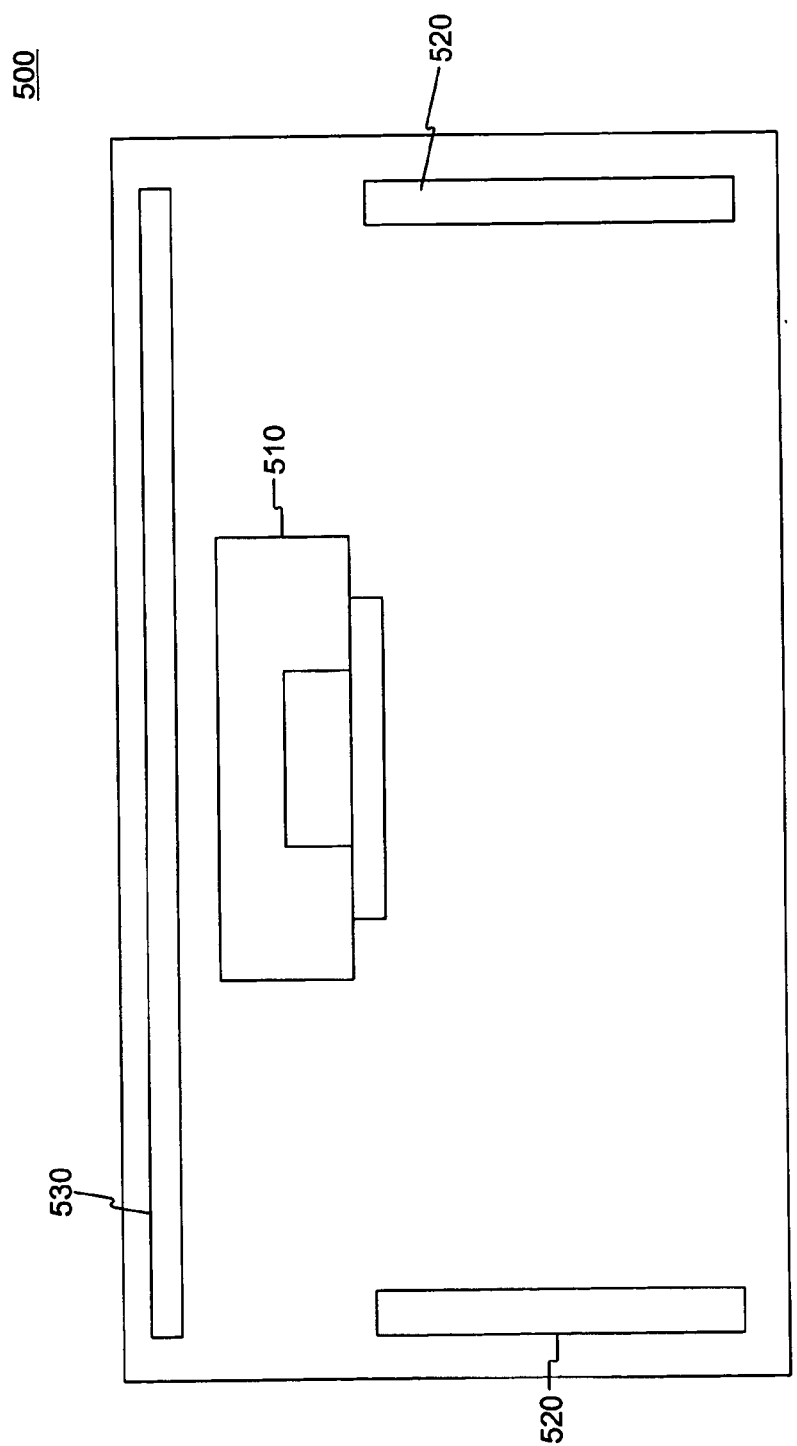
FIG. 5A is a top view of a tray consistent with one embodiment of the invention, as shown in FIGS. 3A–3D and 4A–4D.

FIG. 5A is a top view of a tray consistent with one embodiment of the invention, as shown in FIGS. 3A–3D and 4A–4D. As shown in FIG. 5A, in this implementation, a tray 500 includes a clip 510, two pen holders 520, and a light 530. This implementation is merely exemplary, and other implementations may also be used.

Tray 500 is made of any appropriate material with a suitably flat surface suitable for writing and holding papers during flight. In one implementation, tray 500 may be a molded piece of plastic. This implementation is merely exemplary, and other implementations may also be used.

Clip 510 includes an apparatus for holding papers onto tray 500. In one implementation, clip 510 is a typical spring-loaded clip that is normally in the closed position but may be opened by depressing one end of clip 510. In another implementation, clip 510 may be depressed to hold papers on tray 500. In this implementation, pushing a button would cause clip 510 to rise thereby releasing any papers attached to tray 500. This implementation is merely exemplary, and other implementations may also be used.

Pen holders 520 include any appropriate apparatus for holding a writing implement on tray 500. In one implementation, as shown in FIG. 5A, pen holders 520 may include an indentation in tray 500 wherein a writing implement can be placed. In another implementation, pen holder 520 would include a spring clip that would removably fasten around a writing implement. In yet another implementation, pen holders 520 would include a chain for attaching a writing implement to tray 500. These implementations are merely exemplary, and other implementations may also be used.

Light 530 includes any appropriate apparatus for providing a light source for tray 500. In one implementation, as shown in FIG. 5A, light 530 includes a light bulb integrated in the top surface of tray 500. By depressing light 530, the light bulb is illuminated. This implementation is merely exemplary, and other implementations may also be used.

Figure 5B:
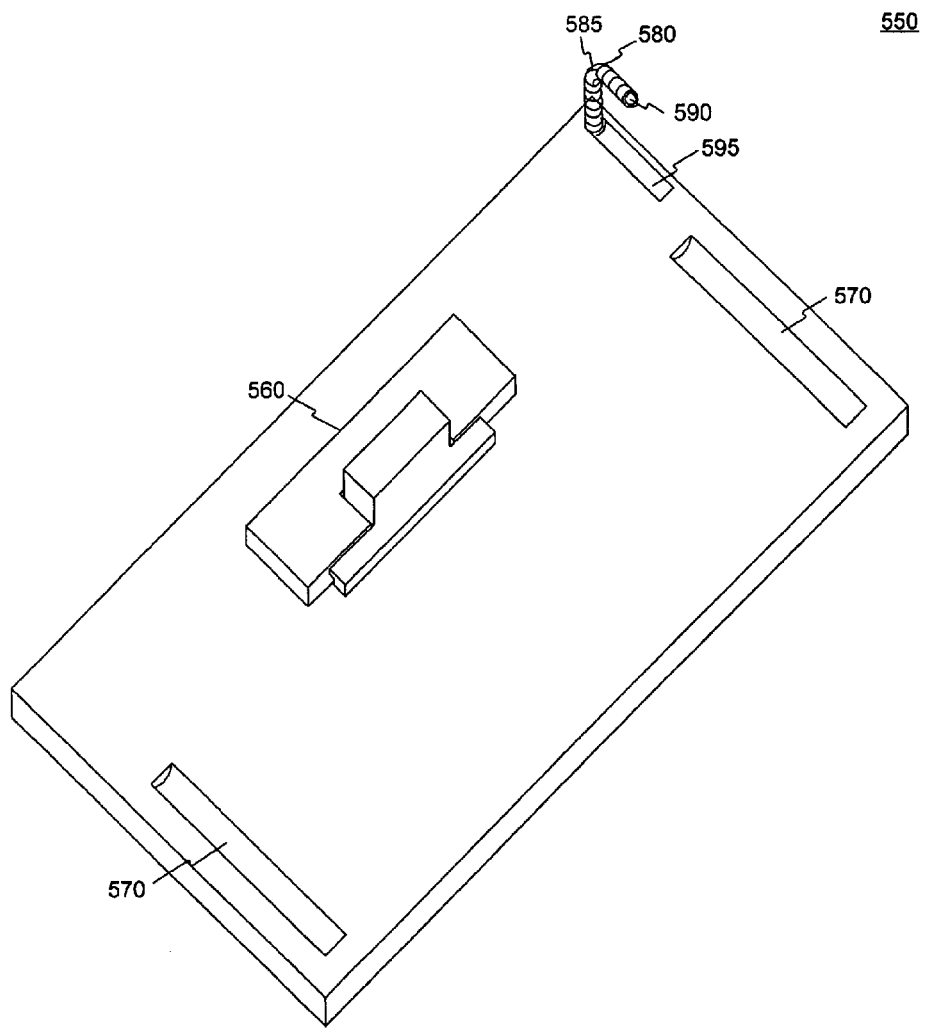
FIG. 5B is a top perspective view of a tray consistent with a second embodiment of the invention, as shown in FIGS. 3A–3D and 4A–4D.

FIG. 5B is a top perspective view of a tray consistent with a second embodiment of the invention, as shown in FIGS. 3A–3D and 4A–4D. As shown in FIG. 5B, in this implementation, a tray 550 includes a clip 560, two pen holders 570, and a light 580. This implementation is merely exemplary, and other implementations may also be used.

Tray 550 is a rectangular piece of any appropriate material with a suitably flat surface suitable for writing and holding papers during flight, as described in FIG. 5A. Clip 560 includes an apparatus for holding papers onto tray 550, as also described in FIG. 5A. Pen holder 570 includes any apparatus for holding a writing implement on tray 550, as described in FIG. 5A. Light 580 includes any apparatus for providing a light source for tray 550, as described in 5A.

In one implementation, light 580 includes a flexible member 585 and a bulb 590 attached at the end of flexible member 585. Flexible member 585 may be rotated in any direction to illuminate any part of tray 550. Flexible member 585 may also be placed in groove 595 when not needed. This implementation is merely exemplary, and other implementations may also be used.

VI. CONCLUSION

As described above, therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. An aircraft bolster tray comprising:

a track section for mounting on a surface in the cockpit of an aircraft, the track section comprising a longitudinal axis;

a sliding section partially located in the track section and mounted for moving within the track section in the direction of the longitudinal axis;

a support arm connected to the sliding section and mounted for rotation relative to the sliding section;

a tray rotating section connected to the support arm and mounted for rotation relative to the support arm; and a tray connected to the tray rotating section.

2. The aircraft bolster tray of claim 1, wherein the track section is mounted on the underside of a surface in the cockpit of an aircraft.

3. The aircraft bolster tray of claim 1, wherein:

the track section further comprises:

two L-pieces having an L-shaped cross-section arranged in the direction of the longitudinal axis and providing a surface on which the sliding section moves, each L-piece including two opposing ends; and two end pieces connected to the surface, each end piece defining a cavity into which one of the opposing ends of each L-piece is inserted and providing a limiting point for the movement of the sliding section on the L-pieces.

4. The aircraft bolster tray of claim 1, wherein:

the sliding section further comprises:

a sliding portion located in the track section and mounted for moving within the track section in the direction of the longitudinal axis;

two side sections connected to opposing points on the sliding portion; and an axle arranged between the side sections and connecting the support arm to the sliding section for rotation of the support arm relative to the sliding section.

5. The aircraft bolster tray of claim 4, further comprising:

a knob connected to the axle to rotate the support arm.

6. The aircraft bolster tray of claim 4, further comprising:
a braking mechanism coupled to the axle and operable when engaged to prevent the rotation of the support arm.

7. The aircraft bolster tray of claim 4, further comprising:
a motor connected to the axle to rotate the support arm.

8. The aircraft bolster tray of claim 1, wherein:
the tray rotating section further comprises:
   a top section connected to the tray;
   two side sections connected to opposing points on the top section; and
   an axle arranged between the side sections and connecting the support arm to the tray rotating section for rotation of the tray rotating section relative to the support arm.

9. The aircraft bolster tray of claim 8, further comprising:
a knob connected to the axle to rotate the tray rotating section.

10. The aircraft bolster tray of claim 8, further comprising:
a braking mechanism coupled to the axle and operable when engaged to prevent the rotation of the tray rotating section.

11. The aircraft bolster tray of claim 8, further comprising:
a motor connected to the axle to rotate the tray rotating section.

12. The aircraft bolster tray of claim 1, wherein:
the tray is mounted for rotation relative to the tray rotating section.

13. The aircraft bolster tray of claim 1, wherein:
the tray rotating section further comprises:
   a rotating portion connected to the tray for rotation of the tray relative to the tray rotating section;
   a top section connected to the rotating portion;
   two side sections connected to opposing points on the top section; and
   an axle arranged between the side sections and connecting the support arm to the tray rotating section for rotation of the tray rotating section relative to the support arm.

14. The aircraft bolster tray of claim 13, further comprising:
a knob connected to the rotating portion to rotate the tray.

15. The aircraft bolster tray of claim 13, further comprising:
a braking mechanism coupled to the rotating portion and operable when engaged to prevent the rotation of the tray.

16. The aircraft bolster tray of claim 13, further comprising:
a motor connected to the rotating portion to rotate the tray.

17. The aircraft bolster tray of claim 1, wherein the tray further comprises a clip.

18. The aircraft bolster tray of claim 1, wherein the tray further comprises a pen holder.

19. The aircraft bolster tray of claim 1, wherein the tray further comprises a light.

20. The aircraft bolster tray of claim 19, wherein the light comprises a light bulb integrated in a top surface of the tray.

21. The aircraft bolster tray of claim 19, wherein the light comprises a flexible member and a bulb attached at an end of the flexible member.

22. The aircraft bolster tray of claim 1, wherein the tray further comprises:
a clip;
a pen; and
a light.

23. An aircraft bolster tray comprising:
a track section for mounting on the underside of a surface in the cockpit of an aircraft, the track section comprising:
   a longitudinal axis;
   two L-pieces having an L-shaped cross-section arranged in the direction of the longitudinal axis and providing a surface on which the sliding section moves, each L-piece including two opposing ends; and
   two end pieces connected to the underside of the surface, each end piece defining a cavity into which one of the opposing ends of each L-piece is inserted and providing a limiting point for the movement of the sliding section on the L-pieces;
a sliding section partially located in the track section and mounted for moving within the track section in the direction of the longitudinal axis, the sliding section comprising:
   a sliding portion located in the track section and mounted for moving within the track section in the direction of the longitudinal axis;
   two side sections connected to opposing points on the sliding portion; and
   a first axle arranged between the side sections and connecting the support arm to the sliding section for rotation of the support arm relative to the sliding section;
a support arm connected to the sliding section and mounted for rotation relative to the sliding section;
a tray rotating section connected to the support arm and mounted for rotation relative to the support arm, the tray rotation section comprising:
   a top section connected to the tray;
   two side sections connected to opposing points on the top section; and
   a second axle arranged between the side sections and connecting the support arm to the tray rotating section for rotation of the tray rotating section relative to the support arm; and
a tray connected to the tray rotating section comprising:
   a clip;
   a pen holder; and
   a light.

24. The aircraft bolster tray of claim 23, further comprising:
a knob connected to the first axle to rotate the support arm.

25. The aircraft bolster tray of claim 23, further comprising:
a braking mechanism coupled to the first axle and operable when engaged to prevent the rotation of the support arm.

26. The aircraft bolster tray of claim 23, further comprising:
a motor connected to the first axle to rotate the support arm.

27. The aircraft bolster tray of claim 23, further comprising:
a knob connected to the second axle to rotate the tray rotating section.

28. The aircraft bolster tray of claim 23, further comprising:
a braking mechanism coupled to the second axle and operable when engaged to prevent the rotation of the tray rotating section.

29. The aircraft bolster tray of claim 23, further comprising:
a motor connected to the second axle to rotate the tray rotating section.

30. The aircraft bolster tray of claim 23, wherein the light comprises a light bulb integrated in a top surface of the tray.

31. The aircraft bolster tray of claim 23, wherein the light comprises a flexible member and a bulb attached at an end of the flexible member.

32. An aircraft bolster tray comprising:
a track section for mounting on the underside of a surface in the cockpit of an aircraft, the track section comprising:
   a longitudinal axis;
   two L-pieces having an L-shaped cross-section, arranged in the direction of the longitudinal axis and providing a surface on which the sliding section moves, each L-piece including two opposing ends; and
   two end pieces connected to the underside of the surface, each end piece defining a cavity into which one of the opposing ends of each L-piece is inserted and providing a limiting point for the movement of the sliding section on the L-pieces;
a sliding section partially located in the track section and mounted for moving within the track section in the direction of the longitudinal axis, the sliding section comprising:
   a sliding portion located in the track section and mounted for moving within the track section in the direction of the longitudinal axis;
   two side sections connected to opposing points on the sliding portion; and
   a first axle arranged between the side sections and connecting the support arm to the sliding section for rotation of the support arm relative to the sliding section;
a support arm connected to the sliding section and mounted for rotation relative to the sliding section;
a tray rotating section connected to the support arm and mounted for rotation relative to the support arm, the tray rotation section comprising:
   a rotating portion connected to the tray for rotation of the tray relative to the tray rotating section;
   a top section connected to the rotating portion;
   two side sections connected to opposing points on the top section; and
   a second axle arranged between the side sections and connecting the support arm to the tray rotating section for rotation of the tray rotating section relative to the support arm; and
a tray connected to the tray rotating section and mounted for rotation relative to the tray rotating section comprising:
   a clip;
   a pen holder; and
   a light.

33. The aircraft bolster tray of claim 32, further comprising:
a knob connected to the first axle to rotate the support arm.

34. The aircraft bolster tray of claim 32, further comprising:
a braking mechanism coupled to the first axle and operable when engaged to prevent the rotation of the support arm.

35. The aircraft bolster tray of claim 32, further comprising:
a motor connected to the first axle to rotate the support arm.

36. The aircraft bolster tray of claim 32, further comprising:
a knob connected to the second axle to rotate the tray rotating section.

37. The aircraft bolster tray of claim 32, further comprising:
a braking mechanism coupled to the second axle and operable when engaged to prevent the rotation of the tray rotating section.

38. The aircraft bolster tray of claim 32, further comprising:
a motor connected to the second axle to rotate the tray rotating section.

39. The aircraft bolster tray of claim 32, further comprising:
a knob connected to the rotating portion to rotate the tray.

40. The aircraft bolster tray of claim 32, further comprising:
a braking mechanism on coupled to the rotating portion and operable when engaged to prevent the rotation of the tray.

41. The aircraft bolster tray of claim 32, further comprising:
a motor connected to the rotating portion to rotate the tray.

42. The aircraft bolster tray of claim 32, wherein the light comprises a light bulb integrated in a top surface of the tray.

43. The aircraft bolster tray of claim 32, wherein the light comprises a flexible member and a bulb attached at an end of the flexible member.

44. An aircraft cockpit comprising:
controls;
instruments;
an instrument panel; and
an aircraft bolster tray comprising:
   a track section mounted on a surface in the cockpit, the track section comprising a longitudinal axis;
   a sliding section partially located in the track section and mounted for moving within the track section in the direction of the longitudinal axis;
   a support arm connected to the sliding section and mounted for rotation relative to the sliding section;
   a tray rotating section connected to the support arm and mounted for rotation relative to the support arm; and
   a tray connected to the tray rotating section.

45. The aircraft cockpit of claim 44, wherein the track section is mounted on a surface of the instrument panel.

46. The aircraft cockpit of claim 44, wherein:
the track section further comprises:
   two L-pieces having an L-shaped cross-section, arranged in the direction of the longitudinal axis and providing a surface on which the sliding section moves, each L-piece including two opposing ends; and
   two end pieces connected to the underside of the surface, each end piece defining a cavity into which one of the opposing ends of each L-piece is inserted and providing a limiting point for the movement of the sliding section on the L-pieces.

47. The aircraft cockpit of claim 44, wherein:
the sliding section further comprises:
   a sliding portion located in the track section and mounted for moving within the track section in the direction of the longitudinal axis;

two side sections connected to opposing points on the sliding portion; and an axle arranged between the side sections and connecting the support arm to the sliding section for rotation of the support arm relative to the sliding section.

48. The aircraft cockpit of claim 47, further comprising:

a knob connected to the axle to rotate the support arm.

49. The aircraft cockpit of claim 45, further comprising:

a braking mechanism coupled to the axle and operable when engaged to prevent the rotation of the support arm.

50. The aircraft cockpit of claim 45, further comprising:

a motor connected to the axle to rotate the support arm.

51. The aircraft cockpit of claim 44, wherein:

the tray rotating section further comprises:

a top section connected to the tray;

two side sections connected to opposing points on the top section; and an axle arranged between the side sections and connecting the support arm to the tray rotating section for rotation of the tray rotating section relative to the support arm.

52. The aircraft cockpit of claim 51, further comprising:

a knob connected to the axle to rotate the tray rotating section.

53. The aircraft cockpit of claim 51, further comprising:

a braking mechanism coupled to the axle and operable when engaged to prevent the rotation of the tray rotating section.

54. The aircraft cockpit of claim 51, further comprising:

a motor connected to the axle to rotate the tray rotating section.

55. The aircraft cockpit of claim 44, wherein:

the tray is mounted for rotation relative to the tray rotating section.

56. The aircraft cockpit of claim 55, wherein:

the tray rotating section further comprises:

a rotating portion connected to the tray for rotation of the tray relative to the tray rotating section;

a top section connected to the rotating portion;

two side sections connected to opposing points on the top section; and an axle arranged between the side sections and connecting the support arm to the tray rotating section for rotation of the tray rotating section relative to the support arm.

57. The aircraft cockpit of claim 56, further comprising:

a knob connected to the rotating portion to rotate the tray.

58. The aircraft cockpit of claim 56, further comprising:

a braking mechanism coupled to the rotating portion and operable when engaged to prevent the rotation of the tray.

59. The aircraft cockpit of claim 56, further comprising:

a motor connected to the rotating portion to rotate the tray.

60. The aircraft cockpit of claim 44, wherein the tray further comprises a clip.

61. The aircraft cockpit of claim 44, wherein the tray further comprises a pen holder.

62. The aircraft cockpit of claim 43, wherein the tray further comprises a light.

63. The aircraft cockpit of claim 62, wherein the light comprises a light bulb integrated in a top surface of the tray.

64. The aircraft cockpit of claim 62, wherein the light comprises a flexible member and a bulb attached at an end of the flexible member.

65. The aircraft cockpit of claim 44, wherein the tray further comprises: a clip; a pen; and a light.

* * * * *